March 3, 1931. L. E. LA BRIE 1,794,857
BRAKE
Filed Oct. 12, 1928
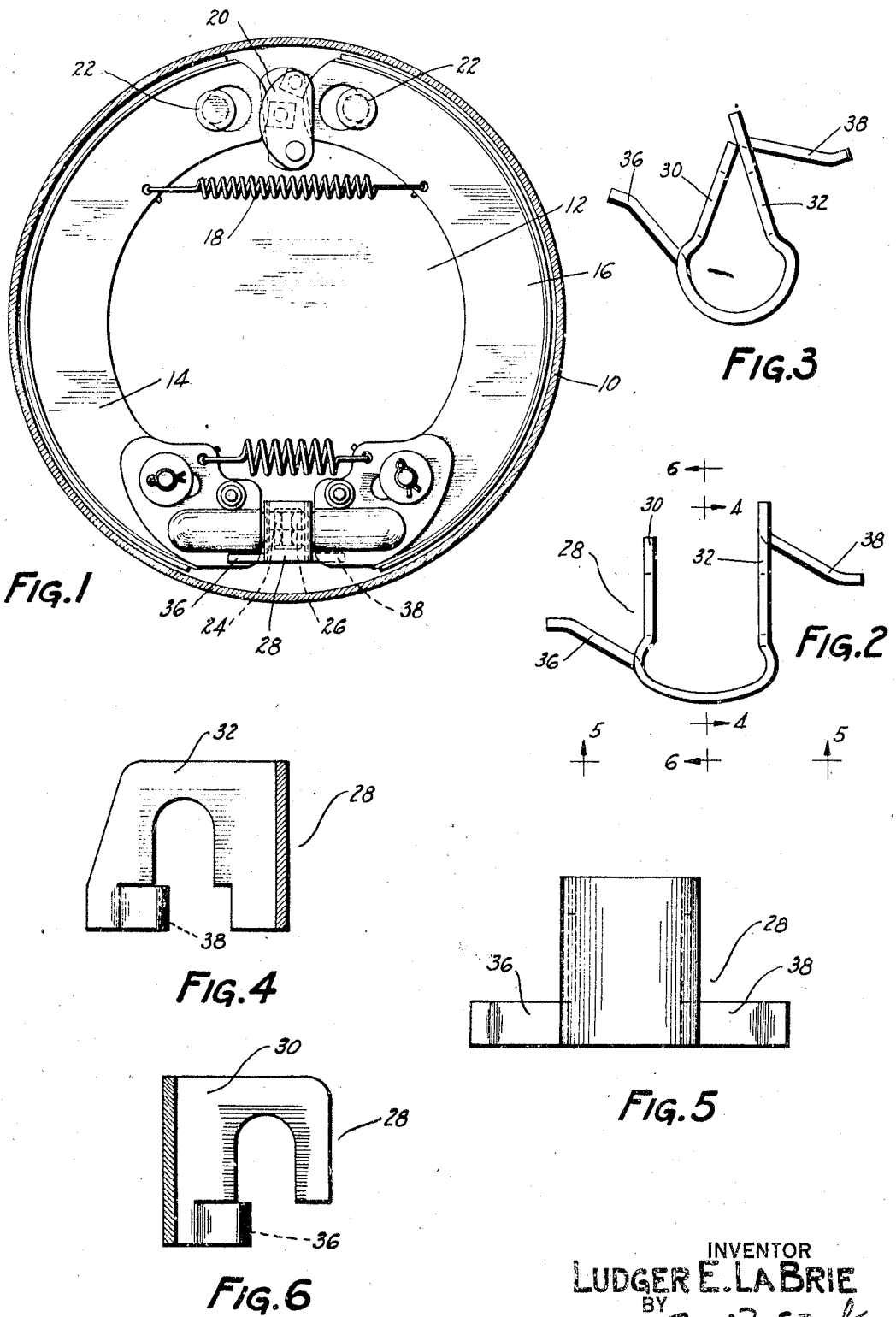
INVENTOR
LUDGER E. LA BRIE
BY
ATTORNEY Patented Mar. 3, 1931

1,794,857

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 12, 1928. Serial No. 312,113.

This invention relates to brakes, and is illustrated as embodied in an internal expanding brake for an automobile. An object of the invention is to provide a simple device for holding yieldingly together two parts of a floating joint connecting two shoes of the brake friction means. This device or resilient clamp may include a member, preferably pressed from sheet metal, having apertured wings embracing the parts of the joint, and having outwardly-projecting holding tongues engaging the adjacent shoe ends.

The above and other objects and features of the invention, including various novel and desirable details of construction, will be apparent from the following description of the illustrative embodiment shown in the accompanying drawing, in which:

Figure 1 is a vertical section through the brake, just inside the head of the brake drum, and showing the brake shoes in side elevation;

Figure 2 is a top plan view of the novel resilient clamp;

Figure 3 is a view corresponding to Figure 2 and showing one step in the manufacture of the clamp;

Figure 4 is a section through the clamp on the line 4—4 of Figure 2;

Figure 5 is an elevation of the clamp looking in the direction of the arrows 5—5 in Figure 2, this being the same direction as in Figure 1 but the clamp being shown on a larger scale; and Figure 6 is a section through the clamp on the line 6—6 of Figure 2.

The illustrated brake includes a rotatable drum 10, at the open side of which is a support such as a backing plate 12, and within which are arranged connected shoes 14 and 16 applied against the resistance of return springs 18 by means such as a floating cam lever 20, and so arranged that when the drum is turning clockwise the shoe 14 anchors against one of two anchors 22 and when the drum is turning counter-clockwise the shoe 16 anchors against the other of the two anchors 22. The joint between the shoes consists of two headed bolts 24 and 26 threaded into sockets in the ends of the shoes, and having an oscillatable engagement with each other.

According to the present invention, the bolts 24 or their equivalents are held together by a novel resilient clamp 28 shown in detail in Figures 2–6. This clamp is generally U-shaped in top plan view (Figure 2), and has apertured wings 30 and 32 through which members 24 and 26 pass respectively and which fit beneath the heads of the members 24 and 26.

During the process of making the clamp from a resilient steel stamping, wings 30 and 32 are bent together as shown in Figure 3, so that when spread apart into positions of Figure 2 and seated over the parts 24 and 26 of the joint they are yieldingly urged toward each other and hold parts 24 and 26 resiliently in engagement with each other.

Part of the material displaced in making the openings in wings 30 and 32 is turned outwardly as holding tongues 36 and 38 engaging the shoes adjacent their ends.

While one illustrative embodiment has been described in detail, it is not my intention to limit the scope of the invention to that particular embodiment, or otherwise than by the terms of the appended claims.

I claim:

1. A connection for a two-part joint comprising a resilient sheet-metal member having apertured wings extending perpendicular to the plane of said joint to embrace the parts thereof, said member having outwardly-projecting holding tongues.

2. A connection for a two-part joint connecting a pair of brake shoes comprising a resilient sheet-metal member having apertured wings to embrace the parts of said joint and having outwardly-projecting holding tongues arranged to engage the sides of said shoes.

3. A brake comprising, in combination, a pair of shoes, a two-part joint connecting the shoes, and a resilient clamp holding the parts of the joint together and having tongues engaging the sides of the shoes.

4. A brake comprising, in combination, a pair of shoes, a two-part joint connecting the shoes, and a resilient clamp holding the parts of the joint together, said clamp having slotted wings, each wing receiving within its slot one part of said joint.

5. A brake comprising a pair of shoes, a two-part joint connecting the shoes, and a resilient clamp holding the parts of the joint together, said clamp having slotted wings extending in a plane perpendicular to the plane of said joint, each wing receiving within its slot one part of said joint.

6. A brake comprising, in combination, a pair of shoes, a two-part joint connecting said shoes, said joint comprising a plurality of headed bolts together with a resilient clamp yieldingly urging said bolts apart and spacing the same, said clamp comprising a plurality of slotted wings adapted to receive the heads of said bolts.

In testimony whereof, I have hereunto signed my name.

LUDGER E. LA BRIE.